US007024064B2

(12) United States Patent
Hill et al.

(10) Patent No.: US 7,024,064 B2
(45) Date of Patent: Apr. 4, 2006

(54) ROAD TRAFFIC MONITORING SYSTEM

(75) Inventors: David J Hill, Dorset (GB); Philip J Nash, Dorset (GB)

(73) Assignee: Qinetiq Limited, Farnborough (GB)

( * ) Notice: Subject to any disclaimer, the term of this patent is extended or adjusted under 35 U.S.C. 154(b) by 218 days.

(21) Appl. No.: 10/470,493

(22) PCT Filed: Feb. 11, 2002

(86) PCT No.: PCT/GB02/00571

§ 371 (c)(1),
(2), (4) Date: Jul. 29, 2003

(87) PCT Pub. No.: WO02/065424

PCT Pub. Date: Aug. 22, 2002

(65) Prior Publication Data

US 2004/0067004 A1 Apr. 8, 2004

(30) Foreign Application Priority Data

Feb. 15, 2001 (GB) .................................... 0103666

(51) Int. Cl.
*G02B 6/00* (2006.01)

(52) U.S. Cl. ........................................... 385/13; 385/12

(58) Field of Classification Search .................. 385/12, 385/13, 32

See application file for complete search history.

(56) References Cited

U.S. PATENT DOCUMENTS 4,818,064 A * 4/1989 Youngquist et al. .......... 385/12
5,056,884 A 10/1991 Quinlan, Jr.
6,563,970 B1 * 5/2003 Bohnert et al. ............... 385/13

FOREIGN PATENT DOCUMENTS

FR 2 673 749 A 9/1992
FR 2 703 451 A 10/1994

* cited by examiner

*Primary Examiner*—Jennifer Doan
(74) *Attorney, Agent, or Firm*—Nixon & Vanderhye P.C.

(57) ABSTRACT

A traffic monitoring system comprises at least one sensor station (2) and an interferometric interrogation system (9); wherein the at least one sensor station (2) comprises at least one optical fibre sensor (5) deployed in a highway (1); wherein the at least one optical fibre sensor (5) comprises a former (14), an optical fibre (13) wound on the former, a casing (15) and compliant material (16) provided between the casing and the former; such that the compliant material reduces the sensitivity of the sensor (5); and wherein the interferometric interrogation system (9) is adapted to respond to an optical phase shift produced in the at least one optical fibre sensor due to a force applied by a vehicle passing the at least one sensor station (2).

25 Claims, 6 Drawing Sheets

ROAD TRAFFIC MONITORING SYSTEM

This is application is the U.S. national phase of international application PCT/GB02/00571 filed 11 Feb. 2002, which designated the US.

This invention relates to a road traffic monitoring system incorporating a multiplexed array of fibre optic sensors, a fibre optic sensor for use in such a system, and a method of traffic monitoring using such a system.

There are several reasons why information regarding road traffic on a particular section of road may be collected. One of these may be for the effective management of road traffic, where information regarding the speed and volume of traffic is useful. This enables alternative routes to be planned in response to accidents or road closures and to attempt to relieve congestion, perhaps by altering speed limits.

Many new roads are built with a sacrificial top layer which is designed to wear out and be replaced. The significant costs associated with road repairs and road building, in addition to the disruption caused by such works, requires that repairs are carried out only when needed. The sacrificial layer should neither be replaced too soon, leading to unnecessary costs, nor too late, risking more serious damage to the underlying structure of the road. An accurate determination of the volume of traffic on a particular road section is therefore essential.

A further reason why traffic information is required is for the enforcement of regulations and laws. There are regulations relating to maximum allowable weights for heavy goods vehicles (HGVs) which are borne out of concerns for safety and also to lessen the damage that overladen vehicles may do to the road structure. A measure of dynamic vehicle weight helps to ensure that such regulations are adhered to.

Simple information regarding vehicle speed may be used to monitor and enforce speed limits.

There may also be a requirement to collect information regarding the types of vehicle using a particular section of road. This may be to prevent unsuitable vehicles such as HGVs from using rural roads or to plan future road building schemes. Classification of vehicle type may be achieved from a determination of dynamic vehicle weight and axle count.

It is clear that information regarding the speed, weight, volume and type of traffic can all be used to help with an effective road traffic management programme. There are several methods in use to obtain this information, however these have associated problems.

Many sections of road are overseen by video cam ras. The images from these cameras are fed to central points to b analysed to provide information regarding vehicle speed and type and traffic volume. However, due to the complexity of the images, it is not always possible to reliably automate the analysis of the data received, meaning that they must be studied visually. There is a limit to how many images can be analysed in this way. Furthermore, the quality of the images collected may be influenced by weather conditions. Fog or rain can obscure the field of view of the cameras, as can high vehicles, and high winds can cause the cameras to vibrate. In many countries, camera systems are operated by law enforcement agencies so there is often an added complication in making the information collected available to the agencies involved with traffic management. It is also not possible to determine the weight of a vehicle from a video image. The commissioning costs of video camera systems for traffic monitoring can also be high.

The vast majority of new roads and large numbers of existing roads are provided with inductive sensors. These are wire loops which are placed below the road surface. As a vehicle passes over the sensor, the metal parts of the vehicle, i.e. the engine and the chassis, change the frequency of a tuned circuit of which the loop is an integral part. This signal change can be detected and interpreted to give a measure of the length of a passing vehicle. By placing two loops in close proximity to one another, it is also possible to determine the vehicle's speed. The quality of the data collected by inductive loop sensors is not always high and is further compromised by the fact that the trend in many modern vehicles is to have fewer metal parts. This leads to a smaller signal change which is more difficult to interpret. Although cheap to produce, inductive sensors are large and as such their placement, particularly in existing roads, causes significant disruption. This has associated costs. A major drawback with the use of inductive loops for traffic management is that they are not amenable to multiplexing. Each sensor site requires its own data collection system, power supply and data communication unit. This increases the cost of the complete sensor significantly, which results in the majority of inductive loops not being connected, and therefore incapable of collecting data. Furthermore, although inductive loops can be used to count vehicles and, if deployed in pairs, determine vehicle speed, they cannot be used to measure dynamic vehicle weight. Vehicle classification is thus not possible.

Two methods for determining the weight of vehicles, in particular HGVs are in common use. Vehicle weight can be measured using a weigh-bridge. This is very accurate but requires the vehicle to leave the highway to a specific location where the measurement can take place. An alternative method is to attempt to measur the weight of the vehicle as it is in transit. Commonly, piezo-electric cables are placed under the surface of the road which produce a signal proportional to the weight of the vehicle as it passes over. This method is more convenient but less accurate than a weigh-bridge. As with inductive loop sensors, piezo-electric sensors are not amenable to multiplexing so each requires a similar data collection system, power supply and data communication unit. The sensors are also more expensive and less robust than inductive loop sensors.

In order to obtain the maximum amount of information regarding traffic on a particular section of road, piezo-electric sensors are often deployed in tandem with inductive loops.

Optical fibre interferometric sensors can be used to detect pressure. When a length of optical fibre is subjected to an external pressure the fibre is deformed. This deformation alters the optical path length of the fibre which can be detected as a change in phase of light passing along the fibre. As it is possible to analyse for very small changes in phase, optical fibre sensors are extremely sensitive to applied pressure. Such a sensor is described as an interferometric sensor. This high sensitivity allows optical fibre sensors to be used for example, in acoustic hydrophones where sound waves with intensities equivalent to a pressure of $10^{-4}$ Pa are routinely detectable. Such high sensitivity can however, also cause problems. Optical fibre interferometric sensors are not ideally suited for use in applications where a low sensitivity is required, for example for detecting gross pressure differences in an environment with high background noise. However, optical fibre sensors have the advantage that they can be multiplexed without recourse to local electronics. Interferometric sensors can also be formed into distributed sensors with a length sufficient to span the width of a highway. This is in contrast to for example, Bragg grating sensors which act as point sensors.

In accordance with a first aspect of the present invention a traffic monitoring system comprises at least one sensor station and an interferometric interrogation system; wherein the at least one sensor station comprises at least one optical fibre sensor deployed in a highway; wherein the at least one optical fibre sensor comprises a former, an optical fibre wound on the former, a casing and a compliant material provided between the casing and the former; such that the compliant material reduces the sensitivity of the sensor; and wherein the interferometric interrogation system is adapted to respond to an optical phase shift produced in the at least one optical fibre sensor due to a force applied by a vehicle passing the at least one sensor station.

This provides a low cost, reliable traffic monitoring system employing simple low cost, robust sensors which can be highly multiplexed. Remote interrogation is possible so neither local electronics nor local electrical power are required.

Preferably, the interferometric interrogation system comprises a reflectometric interferometric interrogation system, more preferably the interferometric interrogation system comprises a pulsed reflectometric interferometric interrogation system Reflectometric interferometry and particularly, pulsed reflectometric interferometry allow for very efficient multiplexing.

Preferably, the optical fibre sensor further comprises at least one semi-reflective element coupled to the optical fibre. For a single, isolated sensor a semi-reflective element is used at either end of the sensor. However, more commonly a number of sensors are connected in series so that each individual sensor need have only one semi-reflective element. In this case, each semi-reflective element acts as the first semi-reflective element for one sensor and also as the second semi-reflective element for the preceding sensor. The exception to this is the last sensor in a series of sensors, which requires an additional, terminal semi-reflective element.

Preferably, the semi-reflective element is one of a fibre optic X-coupler with one port mirrored or a Bragg grating.

Preferably, the former comprises a cylindrical bar incorporating a helical groove and the optical fibre is wound in co-operation with the helical groove.

This allows for ease of manufacture as it ensures that the fibre is wound evenly onto the former.

The material properties of the bar may be chosen such that the sensitivity of the sensor is further reduced.

Preferably, the compliant material is one of a grease, a resin or a plastic.

The mechanical properties of the compliant material can be tailored to give the sensor the required sensitivity. Unlike traditional optical fibre sensors where high sensitivity is paramount, the sensor of the present invention is deliberately de-sensitised by choosing a compliant material which effectively absorbs the majority of any applied force. This means that a sensor comprising a highly compliant material, such as a grease, may be used to detect larger forces and pressures than would ordinarily be possible with existing optical fibre sensors.

Preferably, the system comprises a plurality of sensor stations, wherein adjacent stations are connected together by a length of optical fibre.

The length of optical fibre connecting adjacent sensor stations defin s the optical path length between adjacent sensor stations. Commonly, the connecting optical fibre is extended, and as such the optical path length between adjacent sensor stations is substantially equal to their physical separation. However, the connecting optical fibre need not be fully extended, in which case the physical separation of adjacent sensor stations may be any distance up to that of the length of the optical fibre used to connect adjacent sensor stations.

Conveniently, the length of optical fibre connecting adjacent sensor stations is between 100 m and 5000 m.

Preferably, each sensor station comprises a plurality of fibre optic sensors, more preferably, each sensor station comprises at least one fibre optic sensor per lane of the highway.

Most preferably, each sensor station comprises at least two optical fibre sensors, separated from each other by a known distance, per lane of the highway.

Suitably, the known distance is between 0.5 m and 5 m. The known distance refers to the physical separation of the fibre optic sensors and not to the optical path length of the optical fibre between each sensor.

This provides a traffic monitoring system which can be employed to monitor traffic on any type of highway, from a single lane road to a multi-lane motorway. The sensor stations may be sited at intervals along the entire length of the highway or only on sections where traffic monitoring is crucial, for example at known congestion sites or accident blackspots.

Ensuring that each lane of the highway has at least one fibre optic sensor means that some traffic information can be collected irrespective of the part of the highway on which traffic is flowing. The simplest system for a single lane highway would have two sensors, one for each direction of traffic. Although this would give information regarding vehicle weight, traffic volume and axle count, it could not be used to give a measure of vehicle speed. Vehicle speed may however be determined by placing two sensors, separated by a known, short distance, per lane of the highway. It may be desirable to place more than two sensors per lane of the highway, for example three sensors placed in close proximity to each other may be used to give a measure of vehicle acceleration. Such a measurement may be of use at road junctions, roundabouts or traffic lights.

Preferably, each sensor is deployed so that its longest dimension is substantially in the plane of the highway and substantially perpendicular to the direction of traffic flow on the highway.

Preferably, the longest dimension of each sensor is substantially equal to the lane width of the highway.

This helps to ensure that the passage of any vehicle on any part of the highway is registered by the system.

In the UK the width of a lane of highway may range from around 2.5 m for a minor road up to around 3.7 m for a motorway. Other parts of the world may have road systems of differing lane widths.

Preferably, each sensor is deployed beneath the surface of the highway.

For deployment in an existing road, a thin channel or groove can be cut in the road to accommodate each sensor. The groove may then be re-filled and the surface of the road made good again. Clearly, in the case of a new road the sensors can simply be incorporated into the structure of the road during construction.

It is possible, but less preferred to deploy the sensors so that they are attached to the surface of the highway rather than embedded in it. This may be useful if the system is to be used for a short time in a particular location before being moved. Clearly, in this instance the sensors employed may need to be protected or be strong enough to be able to withstand the greater forces associated with vehicles passing directly over them.

In accordance with a second aspect of the present invention, a method for monitoring traffic comprises providing a plurality of sensor stations on a highway; deploying a plurality of optical fibre sensors at each sensor station; wherein each optical fibre sensor comprises a former, an optical fibre wound on the former, a casing and a compliant material provided between the casing and the former; such that the compliant material reduces the sensitivity of the sensor; interfacing each optical fibre sensor to an interferometric interrogation system, employing time division multiplexing such that the interrogation system is adapted to monitor an output of each optical fibre sensor substantially simultaneously; and using the output of each optical fibre sensor to derive data relating to the traffic passing each sensor station.

Preferably, the method further employs wavelength division multiplexing such that the number of optical fibre sensors which the interrogation system is adapted to monitor is increased.

Preferably, the method further employs spatial division multiplexing such that the number of optical fibre sensors which the interrogation system is adapted to monitor is increased.

Preferably, the data derived relates to at least one of vehicle speed, vehicle weight, traffic volume, axle separation and vehicle classification.

The invention will now be described by way of example only with reference to the following drawings in which.

Figure 4:
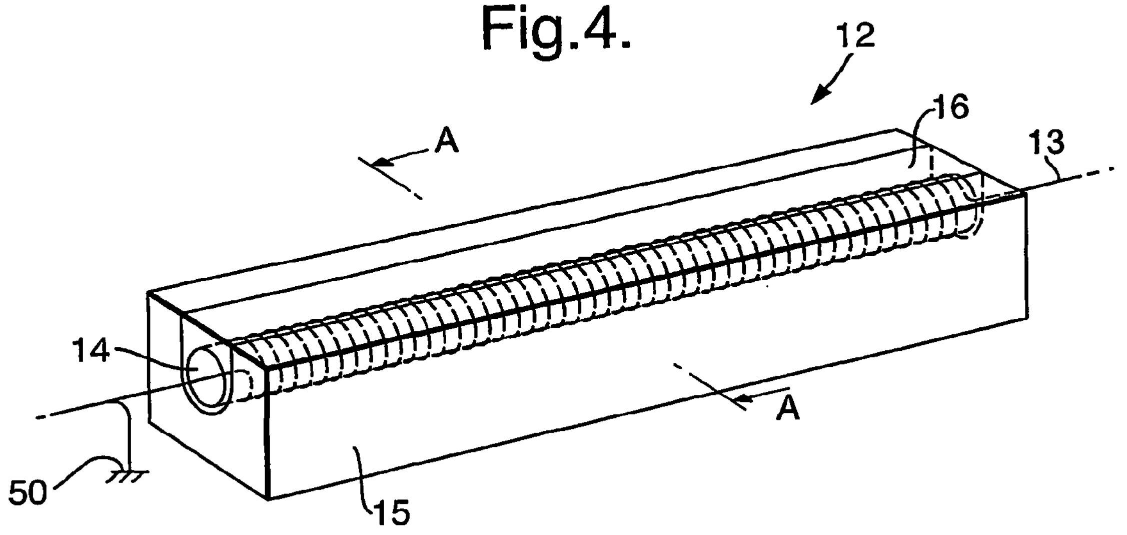
FIG. 4 shows a perspective view of an optical fibre sensor suitable for use in a road traffic monitoring system according to the present invention.
Figure 11A:
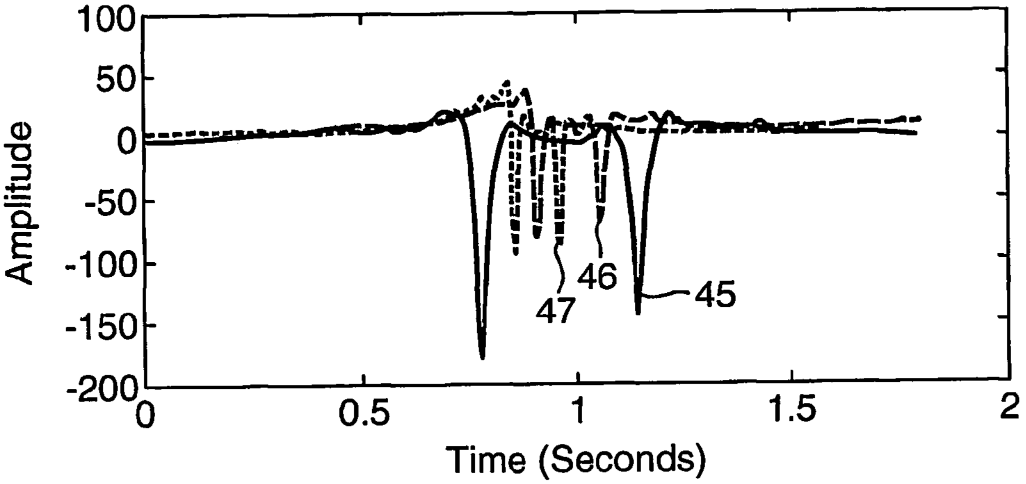
Figure 11B:
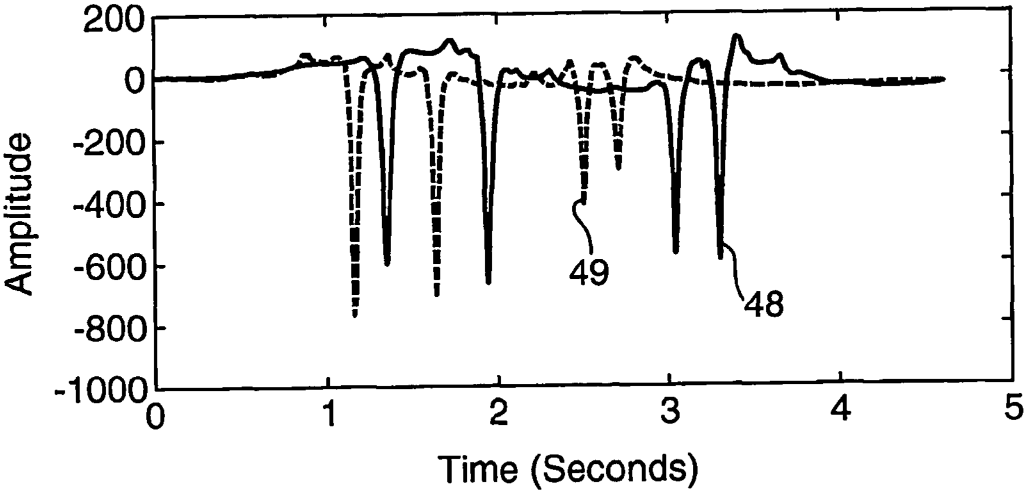

FIGS. 10*a*, 10*b*, 10*c*, 10*d* and 10*e* illustrates how a sensor may be deployed beneath the surface of a highway; and, FIGS. 11*a*and 11*b* show the signals recorded from a car and an HGV passing over a sensor of the type shown in FIG. 4.

Figure 1:
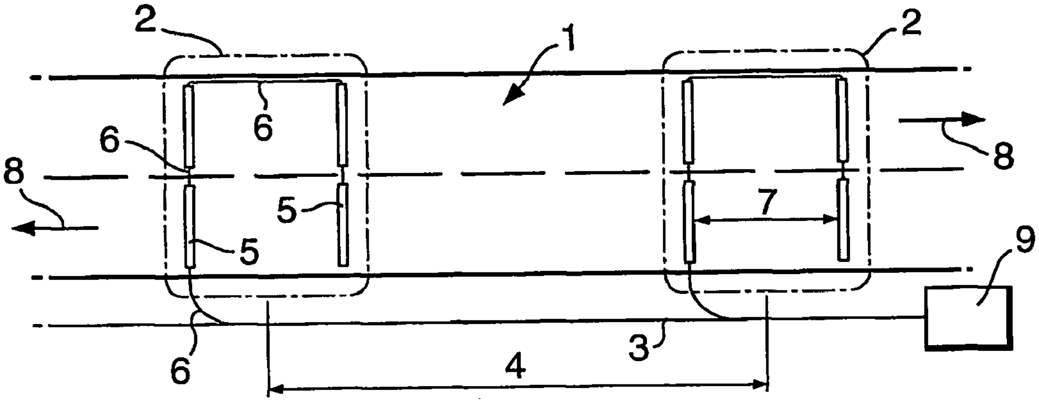
FIG. 1 shows example of a section of a traffic monitoring system according to the present invention in place on a two lane highway.
Figure 2:
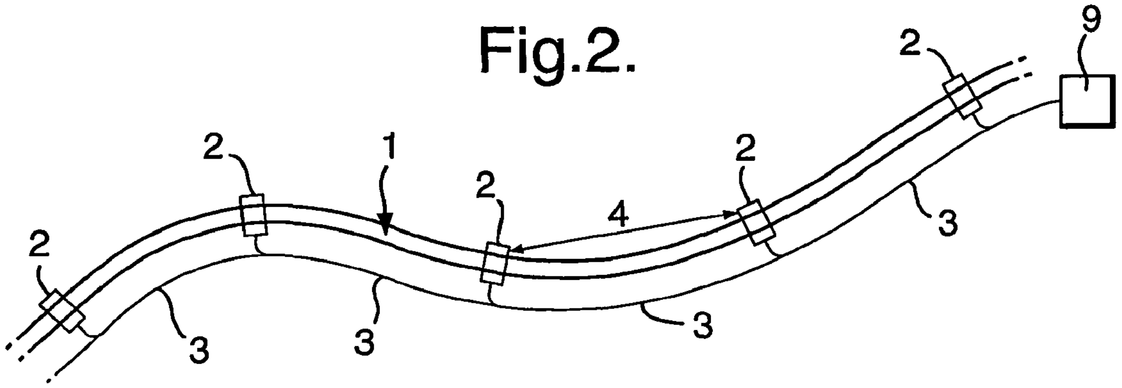
FIG. 2 shows an extended section of a traffic monitoring system according to the present invention.

FIG. 1 shows a section of a traffic monitoring system in place on a two lane highway 1. Two sensor stations 2 are shown connected by a length of optical fibre 3. In FIGS. 1 and 2 the optical fibre 3 is shown extended and hence the physical separation of the sensor stations, indicated by distance 4 is substantially equal to the optical path length of the optical fibre 3. Optical fibre 3 need not be fully extended, in which case the physical separation of the sensor stations, distance 4, may be less than the optical path length of the optical fibre 3. A more extended section of the system showing five sensor stations 2 is shown in FIG. 2.

Each sensor station 2 comprises four fibre optic sensors 5, connected to one another in series and to optical fibre 3 by optical fibre 6. At each sensor station 2 the sensors 5 are deployed in the highway 1 such that there are two sensors, separated as indicated by distance 7, per lane of the highway. Arrows 8 represent the direction of travel of traffic on each lane of the highway. Each sensor is arranged such that its longest dimension is perpendicular to the direction of traffic flow 8, and substantially equal to the width of a lane of the highway. This ensures that a vehicle passing a given sensor station 2 will elicit a response from at least one fibre optic sensor 5, irrespective of its direction of travel or positioning on the lane of the highway. A knowledge of the physical separation of the sensors 7 within each sensor station allows a determination of vehicle speed to be made. All sensor stations are connected by optical fibre 3 to an interferometric interrogation system 9.

Figure 3:
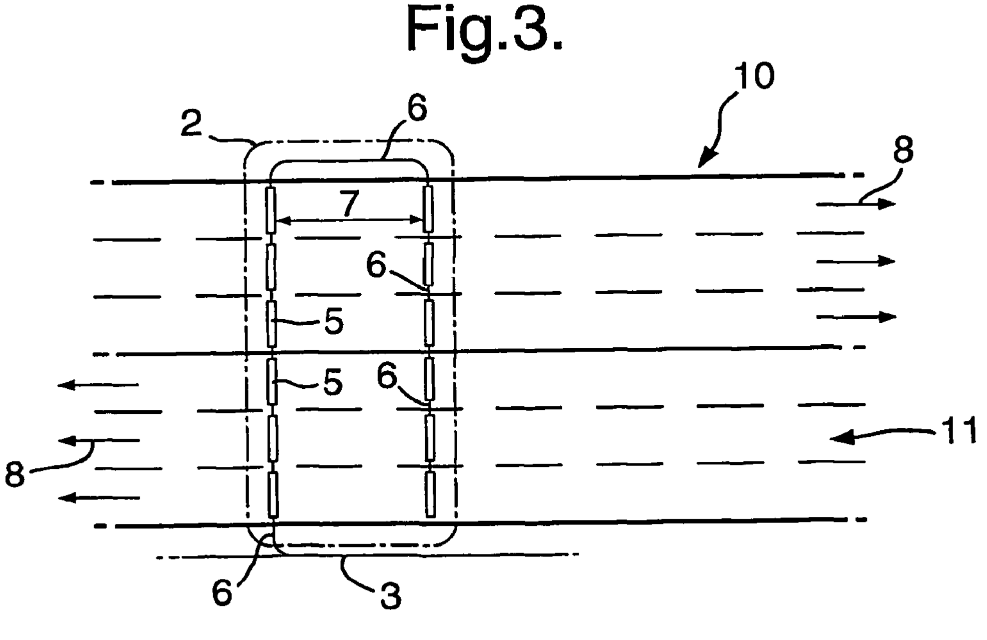
FIG. 3 shows a single sensor station suitable for a traffic monitoring system according to the present invention in place on a six lane highway.

In FIG. 3 a single sensor station 2 is shown in place as part of a traffic monitoring system for a multi-lane highway 10, for example a motorway. In this case twelve sensors 5 are deployed in order to ensure that a vehicle passing the sensor station on any of the six lanes 11 of the highway elicits a response irrespective of its direction of travel 8 or its choice of lane 11.

Figure 5:
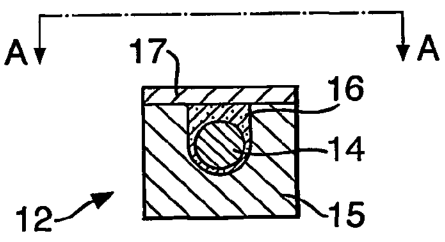
FIG. 5 shows a cross section of the sensor of FIG. 4 taken along the line A—A.

An example of a sensor 12 shown in FIGS. 4 and 5, comprises an optical fibre 13 wound round a cylindrical polyurethane bar 14 and placed into a ‘U’ shaped channel in a casing 15. In this example the optical fibre 13 is a 20 m length of double coated, high numerical aperture fibre with an outside diameter of 170 μm (FibreCore SM1500-6.4/80), although other lengths and specifications of optical fibre may equally be used. The polyurethane bar 14 is 3 m long and has a 1 mm deep helical groove machined into its surface. The optical fibre 13 is wound in co-operation with this groove. This makes it simple to wind the optical fibre evenly along the length of the bar. Clearly, the dimensions of the bar can be altered to provide a sensor of the appropriate size for a desired application. The mechanical properties of the material used to make the bar 14, can affect the performance of the sensor. Some alternatives to polyurethane include steel, other metals and other plastics such as Perspex. A semi-reflective element 50 is coupled to one end of the fibre 13. If the sensor is to be used in isolation, or if it forms the terminal sensor in a series of sensors, then an additional semi-reflective element is coupled to the other end of the sensor.

In order to reduce the sensitivity of the sensor so that it is suitable for detecting large forces and pressures, a compliant material 16 is provided intermediate the bar 14 and the casing 15. This material is able to absorb the majority of any external force applied to the sensor. During manufacture, it is convenient to partially fill the casing 15 with the compliant material 16 and then place the bar 14 and optical fibre 13 on top. The bar is then overfilled with more of the compliant material. As shown in FIG. 5, this results in the bar being completely surrounded by the compliant material. An optional cap 17 may be provided to protect the sensor. This is useful if the compliant material 16 is chosen to be a soft material such as a grease. It may be possible to omit the cap 17, if the compliant material is one which is designed to set, for example, an epoxy resin.

The casing 15 in this example is made from a solid aluminium bar with a 23 mm, square cross section. The 'U' groove is machined from the bar to accommodate the former and optical fibre. The casing is conveniently slightly longer than the bar 14.

Figure 5A:
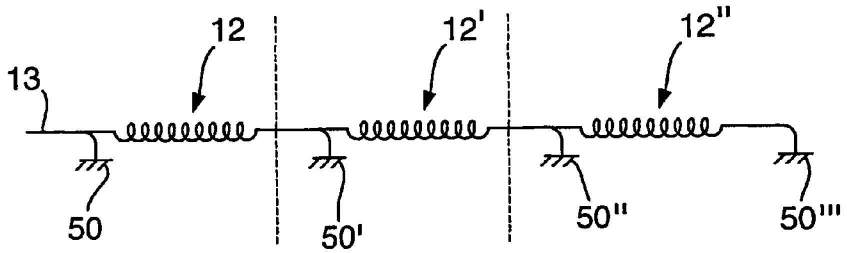
FIG. 5*a* shows a schematic diagram of three sensors connected in series.

In FIG. 5*a*, three sensors 12, 12' and 12" are shown connected in series. Sensors 12 and 12' each have one semi-reflective element 50 and 50' respectively, coupled to the optical fibre 13. In use, sensor 12 employs both semi-reflective elements 50 and 50'. Similarly, sensor 12' is defined by semi-reflective elements 50' and 50". Sensor 12" is a terminal sensor, hence it has two semi-reflective elements coupled to the fibre 50" and 50'".

Figure 6:
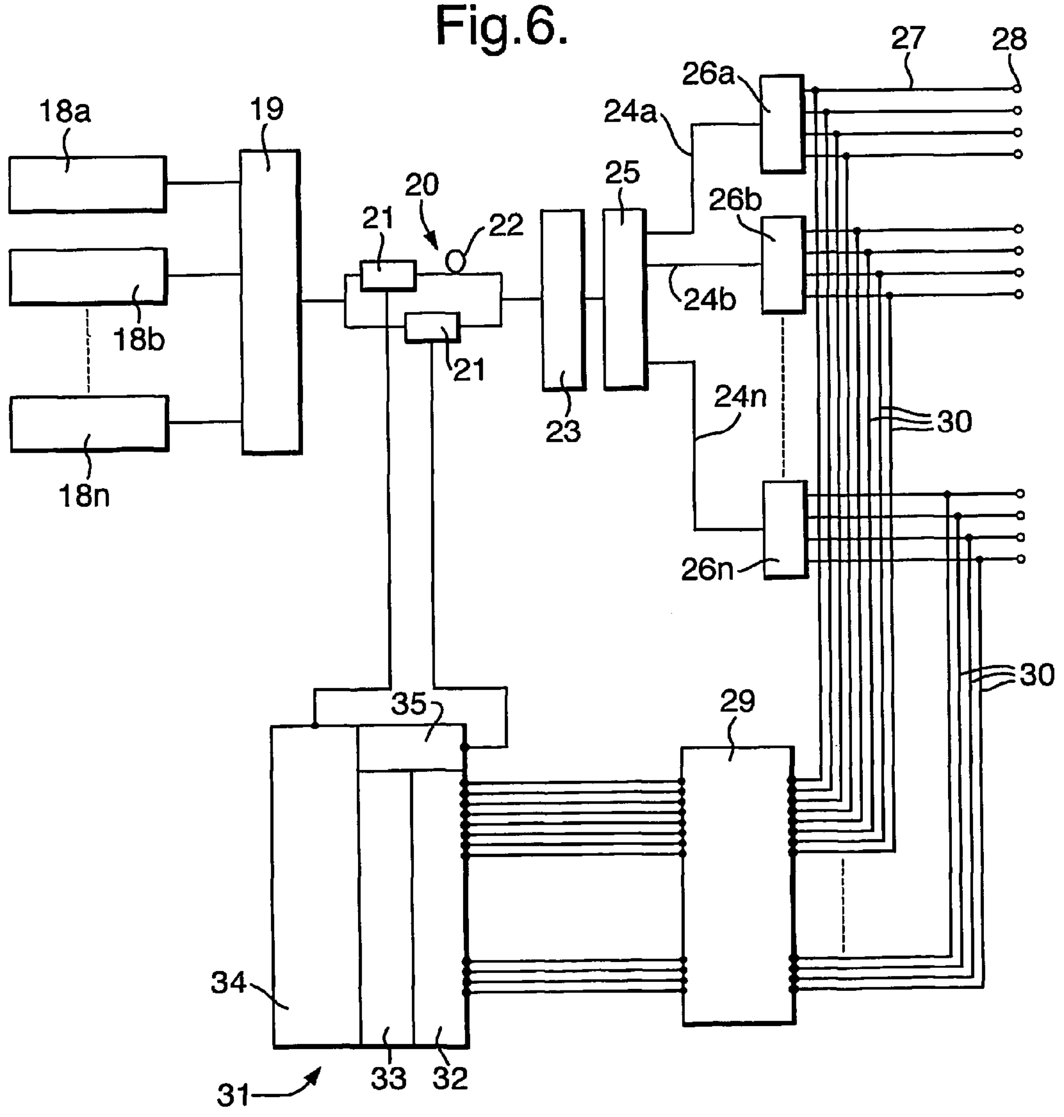
FIG. 6 shows a schematic diagram of an interferometric interrogation system suitable for use in a traffic monitoring system according to the present invention.

FIG. 6 shows an example of an interferometric interrogation system. The architecture of FIG. 6 is based upon a reflectometric time division multiplexed architecture incorporating some additional wavelength and spatial division multiplexing. The light from n distributed feedback (DFB) semiconductor lasers 18 is combined using a dense wavelength division multiplexer (DWDM) 19 before passing through an interferometer 20. The interferometer 20 comprises two acousto-optic modulators (AOM) which are also known as Bragg cells 21 and a delay coil 22. Pulses of slightly different frequency drive the Bragg cells 21 so that the light pulses diffracted also have this frequency difference. The output from the interferometer is in the form of two separate interrogation pulses. These are amplified by an erbium doped fibre amplifier (EDFA) 23, and then separated into n different fibres 24 by a second DWDM 25. Each fibre 24 feeds into a 1×N coupler 26. Each coupler 26 splits the input into N fibres 27. In FIG. 6 each coupler 26 is shown as having four output fibres 27, that is N=4. N may be greater or less than this as required. It is also not necessary that all 1×N couplers 26 have the same value for N. Each fibre 27 terminates in a sensor, a group of sensors or a number of groups of sensors 28. It is clear that the number of individual sensors which can be interrogated by the architecture of FIG. 6 may be large. A typical system may have n=8 and N=4 with 5 groups of 8 sensors connected to each output fibre 27. This provides a system where 1280 individual sensors may be interrogated. The maximum number of sensors is limited by the optical power budget, but may be up to several thousand or more.

The return light from the sensors 28 is passed to individual photo-receivers 29 via return fibres 30. The photo-receivers can incorporate an additional polarisation diversity receiver which is used to overcome the problem of low frequency signal fluctuations caused by polarisation fading. This is a problem common to reflectometric time division architectures. Electrical signals are carried from the photo-receiver to a computer 31 which incorporates an analogue to digital converter 32, a digital demultiplexer 33, a digital demodulator 34 and a timing card 35. After digital signal processing within the computer the signal may be extracted as formatted data for display or storage or converted back to an electrical signal via a digital to analogue converter (not shown).

Figure 7:
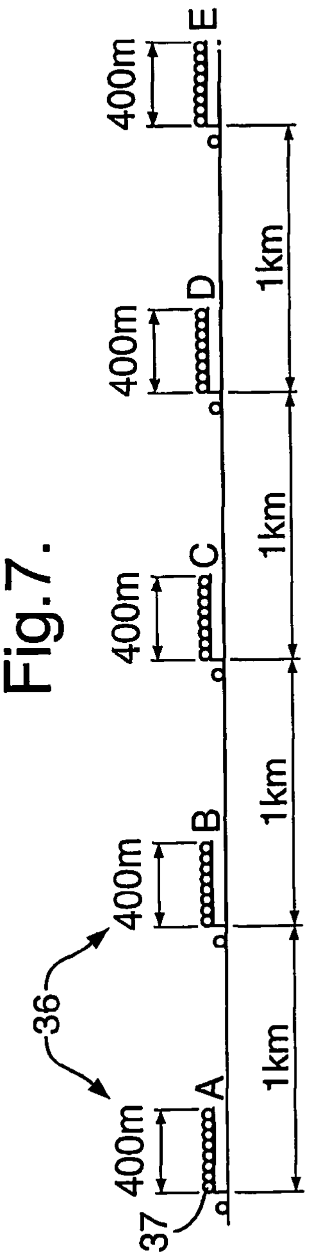
FIG. 7 shows a representation of the spatial arrangement of a set of sensor groups which may be interrogated by the system of FIG. 6.

The success of the architecture of FIG. 6 is critically dependent upon the correct timing of the optical signals. This is achieved by using specific lengths of optical fibre within each sensor, between each sensor within a group of sensors and between each group of sensors. An example arrangement is shown in FIG. 7. Here, five groups 36 of sensors, each group comprising eight individual sensors 37, are shown separated by a distance of 1 km. Each sensor 37 comprises a total of 50 m of optical fibre so each group 36 has an optical path length of 400 m.

On first inspection it may seem to be necessary to deploy groups of sensors at exactly known and measured intervals, for example every 1 km. This is not the case as delay coils may be used to allow sensor groups to be deployed closer together. If a sensor group cannot be deployed within a set distance then a dummy sensor group consisting of a 400 m coil of fibre could be used and the next group of sensors then deployed on the carriageway. Altering the timing of the interrogation pulses will also allow for various group spacings, for example 500 m, 1 km, 5 km as required.

Figure 8:
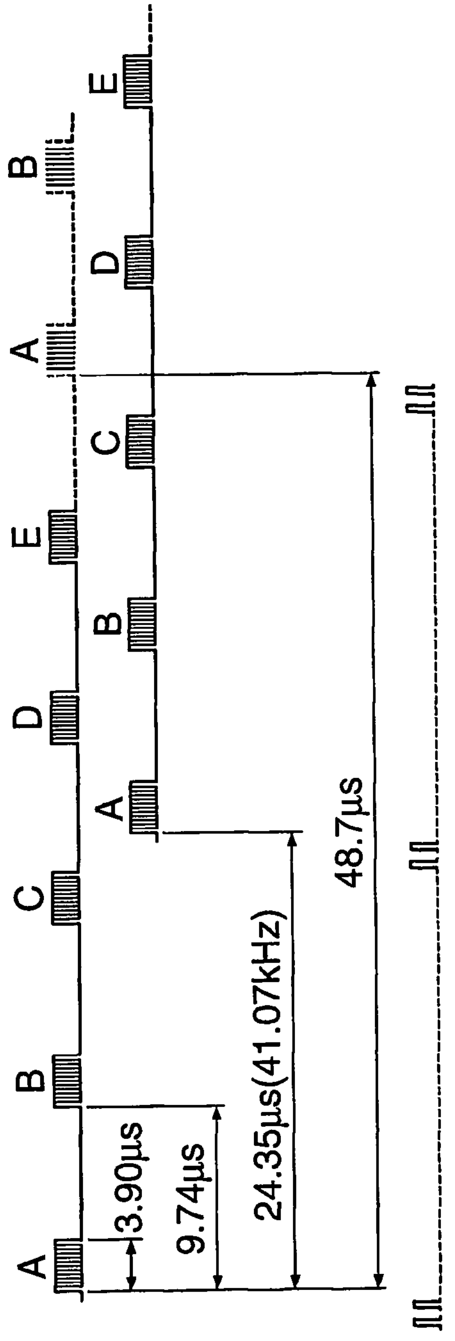
FIG. 8 shows the derivation of the optical signal timings for the set of sensor groups of FIG. 7.

Using the specific fibre lengths defined in FIG. 7, it is possible to define the optical signal timings. This is shown in FIG. 8. This shows that a sampling rate of approximately 41 kHz should be possible for each group of sensors. This results in a measurement bandwidth of several kHz at each, sensor whilst maintaining a high dynamic range. This results in a high dynamic range over a measurement bandwidth of several kHz at each sensor.

The pulse train to the sensors consists of a series of pulse pairs, where the pulses are of slightly different frequencies. At each end of each sensor is a semi-reflector. The pulse separation between the pulses is such that it is equal to the two-way transit time of the light through the fibre between these semi-reflectors. When these semi-reflectors reflect pulse pairs, the reflection of the second pulse overlaps in time with the reflection from the first pulse from the next semi-reflector along the fibre. The pulse train reflected from the s nsor array consists of a series of pulses each containing a carrier signal being the difference frequency between the two optical frequencies. The detection process at the photodiode results in a series of time-division-multiplexed (TDM) heterodyne pulses, each of which corresponds to a particular sensor in the array. When a pressure signal impinges on a sensor it causes a phase modulation of the carrier in the reflected pulse corresponding to that sensor.

To implement the scheme of FIGS. 7 and 8 there is a requirement to generate accurate timing pulses as well as a reasonably sophisticated demultiplexing and demodulation process. By using a computer equipped with analogue to digital converters and able to perform digital signal processing, it is possible to do all of the necessary processing in the digital domain. This improves bandwidth and dynamic range when compared to more conventional analogue approaches.

Figure 9:
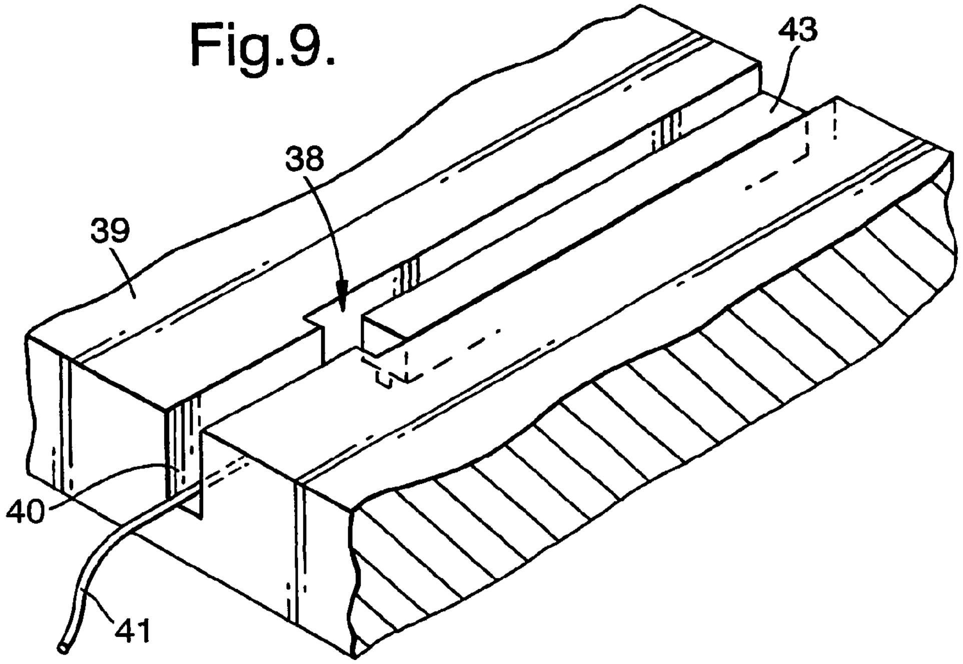
FIG. 9 shows a perspective view of a sensor of the type shown in FIG. 4, deployed beneath the surface of a highway.
Figure 10A:
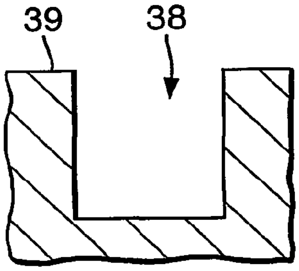
Figure 10B:
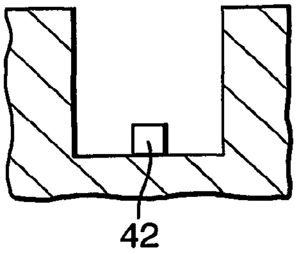
Figure 10C:
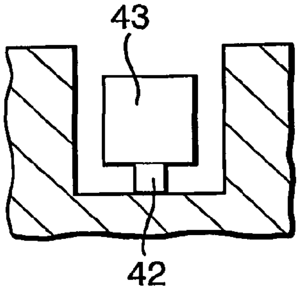
Figure 10D:
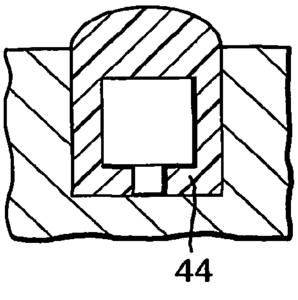
Figure 10E:
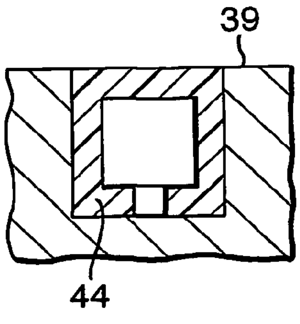

FIGS. 9 and 10 show one example of how sensors may be deployed beneath the surface of a highway. A slot or groove 38 is cut into the surface of a highway 39 using a disk cutter. The groove, which is usually slightly longer than the sensor, includes a thinner section 40 used as a channel to accommodate a lead out optical fibre 41. FIG. 9 shows only a lead out groove from one end of the sensor, clearly a similar groove would be cut at the other end of the sensor to enable two sensors to be connected together. Stand off blocks 42 are placed at intervals along the base of the groove, suitably every 0.5 m or so. The sensor 43 is then deployed on top of the stand off blocks 42. The stand off blocks ensure that the sensor is not directly in contact with the base of the groove thereby helping to insulate it from vibrations. Once the sensor is in place, a potting resin 44 is poured into the groove so that the sensor is completely encapsulated. The stand off blocks allow the potting resin to flow beneath the sensor. Preferably, the groove is slightly overfilled with potting resin as shown in FIG. 10*d*. After a final operation to grind the surface of the resin flush with the surface of the highway, the sensor is suitable for use.

EXAMPLE 1

A single sensor of the type shown in FIG. 4, way deployed in a highway as described in FIGS. 9 and 10. FIG. 11*a* shows the response of the sensor as a car is driven over it at three different speeds; 15 mph, 30 mph and 55 mph shown by data curves 45, 46 and 47 respectively. Each curve comprises two peaks which correspond to the two axles of the car. The distance between the peaks is representative of the axle separation and the axle weight can be derived as a function of the integrated area bounded by each peak and the vehicle speed. In this example the vehicle weight can be derived as the speed of the vehicle is known. As described previously, at least two sensors, separated by a known distance, are required to measure the speed of a passing vehicle.

EXAMPLE 2

FIG. 11*b* shows the data collected as an articulated vehicle was driven over the sensor used in example 1 above. Data curves 48 and 49 represent a laden vehicle and an unladen vehicle respectively. Each curve comprises four peaks, corresponding to the four axles of the vehicle. Again the axle weight is derived from a knowledge of the vehicle speed and the area bounded by the peaks. In this example, however, as the speed of the vehicle was the same for both the laden test and the unladen test, the numerical difference between the areas bounded by the peaks gives a direct indication of the weight difference of the vehicle. This weight difference is equivalent to the weight of the load carried by the vehicle.

The invention claimed is:

1. A traffic monitoring system, the system comprising:

at least one sensor station, wherein the at least one sensor station comprises at least one optical fibre sensor deployed in a highway, wherein the at least one optical fibre sensor comprises:

a former, an optical fibre wound on the former, a casing and a compliant material provided between the casing and the former; such that the compliant material reduces the sensitivity of the sensor; and an interferometric interrogation system, wherein the interferometric interrogation system is responsive to an optical phase shift produced in the at least one optical fibre sensor due to a force applied by a vehicle passing the at least one sensor station.

2. A system according to claim 1, wherein the interferometric interrogation system comprises a reflectometric interferometric interrogation system.

3. A system according to claim 2, wherein the interferometric interrogation system comprises a pulsed reflectometric interferometric interrogation system.

4. A system according to claim 1, wherein the optical fibre sensor further comprises at least one semi-reflective element coupled to the optical fibre.

5. A system according to claim 4, wherein the semi-reflective element is either a fibre optic X-coupler with one port mirrored or a Bragg grating.

6. A system according to claim 1, wherein the former comprises a cylindrical bar incorporating a helical groove.

7. A system according to claim 6, wherein the optical fibre is wound in co-operation with the helical groove.

8. A system according to claim 1, wherein the compliant material is one of a grease, a resin or a plastic.

9. A system according to claim 1, comprising a plurality of sensor stations, wherein adjacent stations are connected together by a length of optical fibre.

10. A system according to claim 9, wherein the length of optical fibre connecting adjacent sensor stations is between 100 m and 5000 m.

11. A system according to claim 1, wherein each sensor station comprises a plurality of optical fibre sensors.

12. A system according to claim 11, wherein each sensor station comprises at least one optical fibre sensor per lane of the highway.

13. A system according to claim 11, wherein each sensor station comprises at least two optical fibre sensors, separated from each other by a known distance, per lane of the highway.

14. A system according to claim 13, wherein the known distance is between 0.5 and 5 m.

15. A system according to claim 1, wherein each sensor is deployed so that its longest dimension is substantially in the plane of the highway and substantially perpendicular to the direction of traffic flow on the highway.

16. A system according to claim 1, wherein the longest dimension of each sensor is substantially equal to the lane width of the highway.

17. A system according to claim 1, wherein each sensor is deployed beneath the surface of the highway.

18. A method for monitoring traffic, the method comprising the steps of:

providing a plurality of sensor stations on a highway;

deploying a plurality of optical fibre sensors at each sensor station; wherein each optical fibre sensor comprises:

a former, an optical fibre wound on the former, a casing and a compliant material provided between the casing and the former; such that the compliant material reduces the sensitivity of the sensor;

interfacing each optical fibre sensor to an interferometric interrogation system, employing time division multiplexing such that the interrogation system is adapted to monitor an output of each optical fibre sensor substantially simultaneously; and using the output of each optical fibre sensor to derive data relating to the traffic passing each sensor station.

19. A method according to claim 18, further employing wavelength division multiplexing such that the number of optical fibre sensors which the interrogation system is adapted to monitor is increased.

20. A method according to claim 18, further employing spatial division multiplexing such that the number of optical fibre sensors which the interrogation system is adapted to monitor is increased.

21. A method according to claim 18, wherein the data derived relates to vehicle speed.

22. A method according to claim 18, wherein the data derived relates to vehicle weight.

23. A method according to any of claims 18, wherein the data derived relates to traffic volume.

24. A method according to any of claims 18, wherein the data derived relates to axle separation.

25. A method according to any of claims 18, wherein the data derived relates to vehicle classification.

* * * * *